INVENTOR.
FREDERICK TOURTELLOTTE
BY
Barner, Kisselle, Raisch & Choate

Sept. 14, 1965   F. TOURTELLOTTE   3,205,782
POWER TRANSMISSION
Filed May 28, 1962   3 Sheets-Sheet 2

INVENTOR.
FREDERICK TOURTELLOTTE
BY
Barnes, Kisselle, Raisch & Choate

Sept. 14, 1965   F. TOURTELLOTTE   3,205,782
POWER TRANSMISSION

Filed May 28, 1962   3 Sheets-Sheet 3

INVENTOR.
FREDERICK TOURTELLOTTE
BY
Barnes, Kisselle, Raisch & Choate

United States Patent Office 3,205,782
Patented Sept. 14, 1965

3,205,782
POWER TRANSMISSION
Frederick Tourtellotte, Royal Oak, Mich., assignor to Sperry Rand Corporation, a corporation of Delaware
Filed May 28, 1962, Ser. No. 198,187
22 Claims. (Cl. 91—3)

This invention relates to servo systems and particularly fluid power amplifiers for use in servo systems.

Extensive use of servo systems has been made in recent years in the fields of hardware for aircraft and missiles, electronics, machine tools and similar applications. A dominant factor in such uses is the reliability of the system which has been necessarily limited by the contamination tolerance due to micron size particles in the hydraulic fluid.

It is an object of this invention to provide a servo system which has high contamination tolerance, good dynamic response, and which can be readily combined into a redundant or cascaded system for aircraft and missile hardware applications.

It is a further object of the invention to provide a fluid power amplifier utilizing a novel jet pipe principle and incorporating a hydraulic as contrasted to a mechanical feedback.

It is a further object of the invention to provide such a fluid power amplifier which has a high degree of contamination tolerance.

Basically, the servo system according to the invention embodies a first stage consisting of a torque motor and a jet pipe operable by the torque motor, a second stage consisting of a shiftable member or spool the position of which is controlled by the jet pipe, and a third stage comprising a hydraulic power unit to which the flow of fluid is controlled by the second stage. The power element of the third stage is mechanically connected to the jet pipe, preferably through a torsion linkage, for returning the jet pipe to its original position after the power element of the third stage is moved. Further, according to the invention, a fixed diffuser opening or slot is provided in communication with the bore in which the spool operates and the spool includes a pair of control chambers with a radially extending barrier therebetween. The length of the diffuser opening is greater than the width of the barrier so that when the jet is centered with respect to the diffuser opening and the barrier, the control pressures developed in the control chambers of the spool are equal and the spool remains stationary. Any movement in the spool due to an external force produces a greater pressure in one control chamber than the other causing a shifting of the spool until the control barrier on the spool moves to a position corresponding to the effective pressure center of the diffuser slot. If a signal is provided to the torque motor, the jet is moved relative to the control barrier causing a greater pressure in one control chamber than the other and, in turn, causing the spool to shift. This will cause fluid controlled by the spool to pass to the third stage power unit moving the power element thereof. This will, in turn, due to mechanical follow-up linkage, return the jet pipe to its original position with respect to the diffuser slot. The control pressures in the control chambers will again change returning the spool to its original centered position to cut off the flow of hydraulic fluid to the third stage. The operation of the system will be more readily apparent as hereinafter described.

Figures 1, 2:
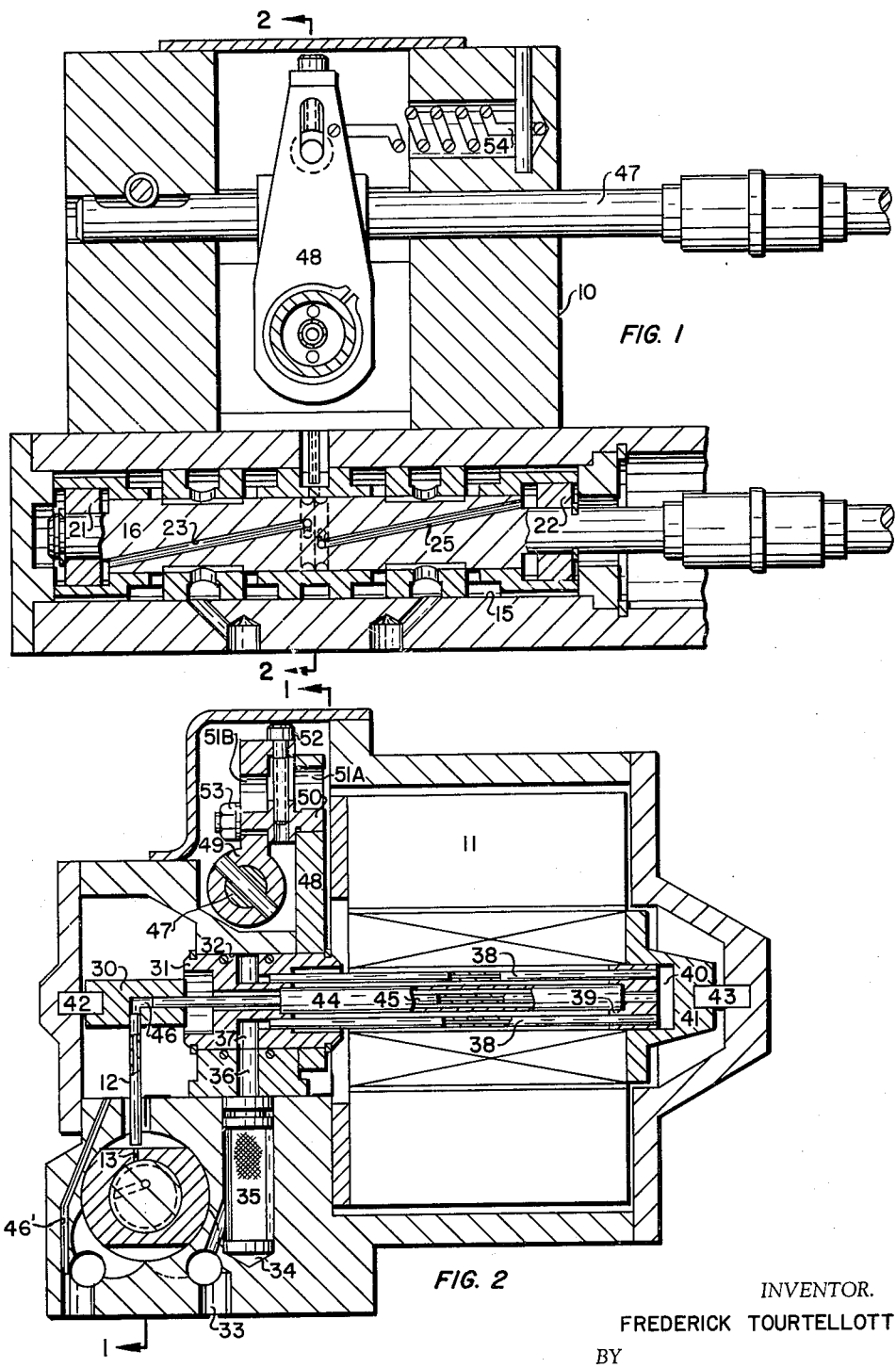
FIG. 1 is a sectional view through a fluid power amplifier forming part of the system taken substantially along the line 1—1 in FIG. 2.
FIG. 2 is a sectional view taken along the line 2—2 in FIG. 1.
Figure 5:
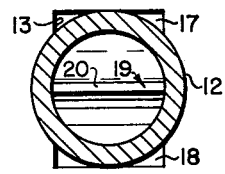
FIG. 5 is a fragmentary sectional view taken along the line 5—5 in FIG. 4.

Referring to FIGS. 1 and 2, the fluid power amplifier forming a part of the servo system comprises a housing 10 in which an A.C. or D.C. torque motor 11 is positioned and upon signal operates to move a jet pipe 12 to control the issuance of a high velocity jet from the jet pipe. The fluid jet from the jet pipe 12 is directed into a diffuser slot 13 of a sleeve 14 fixed in a bore 15 in the housing 10. A shiftable spool 16 is provided in sliding relation to the sleeve 14 and is formed with longitudinally spaced fluid receiving control chambers 17, 18 (FIG. 3) defined by annular grooves which have a substantially semi-circular cross section. An annular control barrier 19 extends radially outwardly between the control chambers 17, 18 to separate the control chambers from one another. The control barrier 19 is preferably formed with a flat narrow cylindrical surface 20. As shown in FIG. 5, the length of the diffuser slot 13 in a direction longitudinally of the spool 16 is greater than the longitudinal width of the surface 20 of the control barrier 19. The length of control chambers 17, 18 is not critical provided they are at least as long as one half the length of slot 13.

Figure 3:
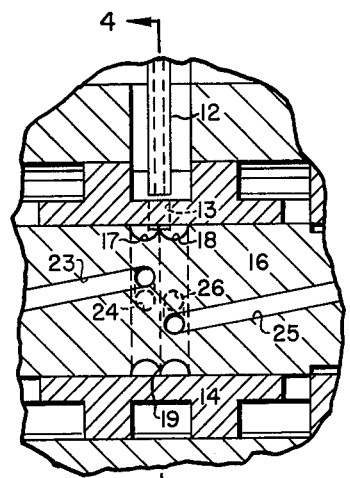
FIG. 3 is a fragmentary sectional view on an enlarged scale of a portion of the device shown in FIG. 1 taken substantially along the line 3—3 in FIG. 4.

As shown in FIGS. 1 and 3, the spool 16 is formed with enlarged ends 21, 22 defining pistons and the pressure in control chamber 17 is directed adjacent the rod end of piston 21 by passages 23, 24 and the control chamber 18 is directed to the rod end of piston 22 by passages 25, 26. The position of the spool 16 with respect to the sleeve 14 is adapted to control the flow of fluid to a third stage power element.

Referring to FIG. 2, jet pipe 12 is mounted on a block 30 which, in turn, is rotatable relative to a position platform 31 rotatably mounted in a cylindrical seat 32 in the housing. Hydraulic fluid is supplied to the housing through an inlet 33 and passes to a filtering chamber 34 in which a filter 35 is positioned. The fluid thereafter passes through an opening 36 to an annular chamber 37 in the position platform 31. From the annular chamber 37 the fluid flows through thin flexible tubes 38 which have one end thereof fixed to the position platform and the other end thereof fixed to a header block or summing junction 39 press fitted into an armature suport 41. The fluid passes from the tubes 38 to a header chamber 40 formed between the header block 39 and armature support 41. The block 30 and the armature support 41 are mounted in the housing by flexible supports 42, 43, respectively. A drain opening 46' is provided from the area adjacent the jet pipe 12 to an outlet in the housing. The torque motor 11 is of conventional construction and has the armature thereof mounted on the armature support 41. A torque tube barrier 44 extends axially between and has its ends fixed to the header block 39 and the positioning platform 31. Within the torque tube barrier 44 a relatively stiff liquid supply tube 45 extends from the header block 39 through the positioning platform to the block 30. A small connecting passage 46 in block 30 provides communication with the jet pipe 12.

When an electrical signal is supplied to the torque motor 11, the armature is rotated in turn rotating the header block 39 and twisting the barrier 44 and tubes 38 relative to the platform 31. The rotation of the header block 39 rotates the block 30 swinging the jet pipe 12. The subsequent action moving the power unit, as presently described, causes a mechanical linkage to operate a feed back shaft 47 which is connected to a yoke 48 that, in turn, is fixed to the positioning platform 31 to rotate the positioning platform 31 and return the jet pipe to its original position. The degree of rotation of the platform 31 for a predetermined movement of the feed back shaft 47 can be readily adjusted by a linkage which includes an adjustable crank arm 50 extending into a slot 51A on the yoke 48 and slot 51B on the feed back shaft 47. Rotation of a screw 52 journalled on the yoke 48 and threaded into crank arm 50 causes the crank arm 50 to move radially inwardly and outwardly to vary the mechanical advantage between the feed back shaft 47 and the positioning platform 31. A lock nut 53 is provided to hold the crank arm in adjusted position relative to the feed back shaft 47. A spring 54 is supplied between the housing and the yoke 48 to take up backlash in the crank arm linkage.

Figure 7:
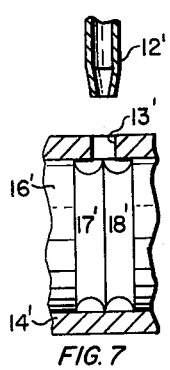
FIG. 7 is a diagrammatic view of the jet pipe arrangement.
Figure 8:
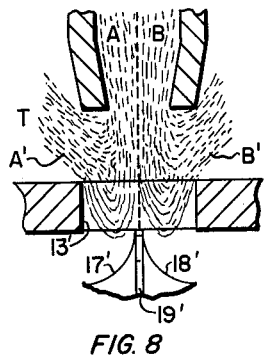
FIGS. 8 and 9 are partly diagrammatic views representing the theoretical operation of the jet pipe arrangement.

The operation of the jet pipe 12, diffuser slot 13, barrier 19 and control chambers 17, 18 can be more readily understood by reference to the partly diagrammatic drawing, FIG. 7. The high velocity jet of fluid from the jet pipe 12' penetrates the diffuser slot 13' to the depth of the control barrier 19' and in so doing has its kinetic flow energy converted into static control pressure. The control barrier 19' separates the control chambers 17', 18'. Initially, if the control barrier 19' and jet from the jet pipe 12' are centered with respect to each other and to the diffuser slot 13', as shown in FIG. 8, the control pressures developed in the control chambers 17', 18' are equal and the spool 16 will remain stationary.

If the spool 16' is moved by an external force in the servo system, for example, by a change in load conditions, to the left, control chamber 18' will now receive a greater portion of the jet flow and the pressure in control chamber 18' will increase. It should be understood that there will be very little flow in the chambers 17', 18' since they are already filled with fluid. Any increase in pressure is transmitted by the passages to the corresponding control area of the spool producing a differential pressure which will return the control barrier 19' to the pressure center of the jet. The spool thus will assume at all times the position such that the pressures in the control chambers 17', 18' are equal.

If a signal from the torque motor moves the pipe relative to the control barrier, a momentary pressure change will be produced between control chambers 17', 18', the pressure in the receiver toward which the jet is directed increasing and the spool will move correspondingly and position the control barrier 19' in such a way that equal control pressures exist in the control chambers 17', 18'. The movement of the spool and its return will, in turn, cause a displacement in the power elements being controlled. Movement of the power element through the mechanical linkage will move the jet pipe platform and summing junction and return the jet pipe to its original position.

In the arrangement shown, the barrier 19' operates in the manner of a sensing device to sense the pressure in the diffuser slot 13'. The pressure in the diffuser slot will vary increasing toward the center when the jet is centered relative to the slot.

Figure 9:
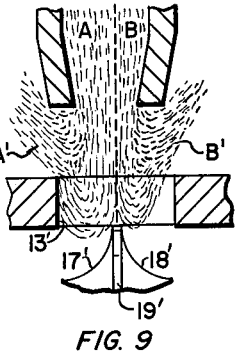
Figure 10:
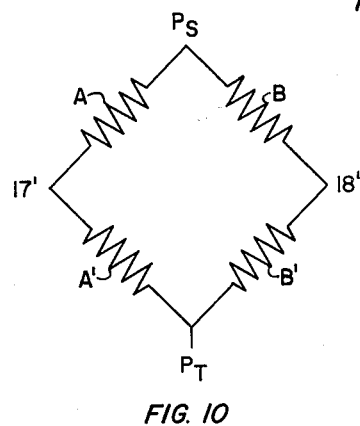
FIG. 10 is an electrical circuit indicating the theoretical electric analogy to the fluid power amplifier which embodies the invention as represented by FIGS. 8 and 9.

The arrangement permits large openings thus increasing the contamination tolerance of the system. In addition, a substantial gain is produced as theoretically shown by reference to FIGS. 8 and 9. As shown in FIG. 8, the jet issuing from the pipe 12' may be considered as comprising two components A and B. The pressure from these components is applied to the control chambers 17', 18'. The fluid is returned to the area T at which the pressure corresponds to $P_T$. Thus, a balanced arrangement corresponding to an electrical bridge is provided. However, if the barrier moves relative to the jet, as shown in FIG. 9, the portion A of the jet directed to control chamber 17' increases while the portion B to the other control chamber 18' decreases. At the same time, the passage of portion A' of the fluid on the side of the portion A' to area T decreases so that pressure in control chamber 17' is further increased. Similarly, the flow of portion B' to area T is less restricted further lessening the pressure in control chamber 18'. Thus, the flow in the fluid power amplifier can be contrasted to the electrical analogy of a Wheatstone bridge such as shown in FIG. 10 wherein the legs A, B represent the portions of the jet directed into the control chambers 17', 18' and the legs A', B' represent the portions of the jet returning to the area T.

To summarize; the operation of the valve can be broken down into the following sequences:

(1) The jet pipe is positioned by a torque motor relative to the diffuser slot 13.

(2) The hydraulic jet directed into the diffuser slot 13 creates pressure gradients across the bottom of the slot 13. The position or pattern of the pressure gradient is controlled by the relative position of the jet with respect to the diffuser slot 13.

(3) The control barrier senses the pressures in the diffuser slot 13.

(4) The spool 16 will position itself in such a way that equal control pressures exist in each receiver at all times.

The principal advantages of the jet pipe diffuser-slot configuration are as follows:

(1) The configuration is insensitive to dirt. Fluid filtered to only 200 microns and even above can be continuously handled.

(2) All springs and feed back wires can be eliminated from the valve.

(3) Dynamic response is very good.

(4) High differential control pressure can be developed to overcome the effects of dirt.

(5) The displacement of the spool 16 is directly proportional to the displacement of the jet pipe 12, but the ratio is not equal to unity. The ratio is fixed by the relative size of the jet and slot 13. By increasing the size of the jet diameter relative to the length of the slot 13, an increase in gain is effected; where gain is defined by the expression:

$$G = 1 + \frac{a}{r}$$

where $G$=gain, $a$=one half the diameter of the jet and $r$=the distance between the end of the slot 13 and edge of the jet when the jet is centered ($2a+2r$=length of slot). (The effect is a reduction in the stroking requirements of the torque-motor actuator.)

Figure 4:
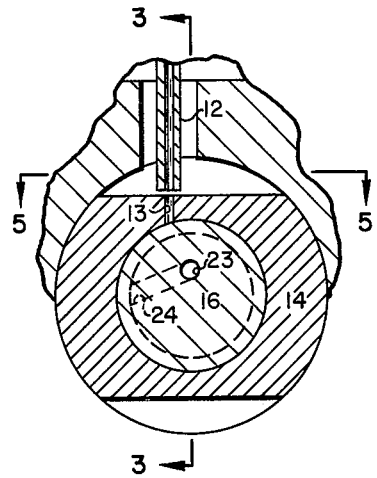
FIG. 4 is a fragmentary sectional view taken along the line 4—4 in FIG. 3.

As shown in FIG. 4, the diffuser slot 13 is preferably positioned other than radially with respect to the spool so that the pressure of the jet of fluid into the diffuser slot tends to constantly rotate the spool to prevent what is known as silting, that is, a sticking of the spool due to small particles or other contaminants in the hydraulic fluid.

Figure 6:
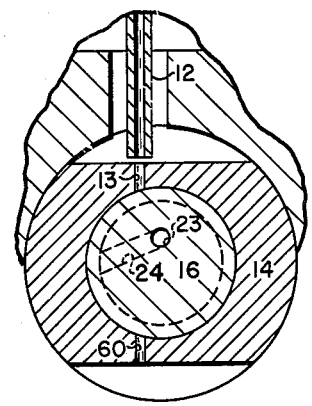
FIG. 6 is a fragmentary sectional view similar to FIG. 4 of a modified form of the invention.

In the form shown in FIG. 6, an additional exhaust outlet 60 is provided from the chambers 17, 18 to provide greater stability for the system. This is equivalent in its stabilizing effect to enlarging the lateral or transverse width of the diffuser slot 13. However, use of the angularly displaced outlet 60 provides for more effective rotation of the spool.

The fluid power amplifiers may be connected in multiple in a servo system, in a redundant or cascaded system. The triple redundant servo valve system shown in FIG. 11 consists of three independent servo systems 10 that have their pressure passages $C_1$, $C_2$ connected to parallel linked third stage power cylinders C.

The incorporation of the jet pipe principle into the control stage provides a high level of contamination tolerance because of the ability of the first stage to pass large dirt particles. Further, a jet pipe diffuser slot arrangement eliminates the troublesome mechanical feed back normally required between the first and second stages.

Figure 11:
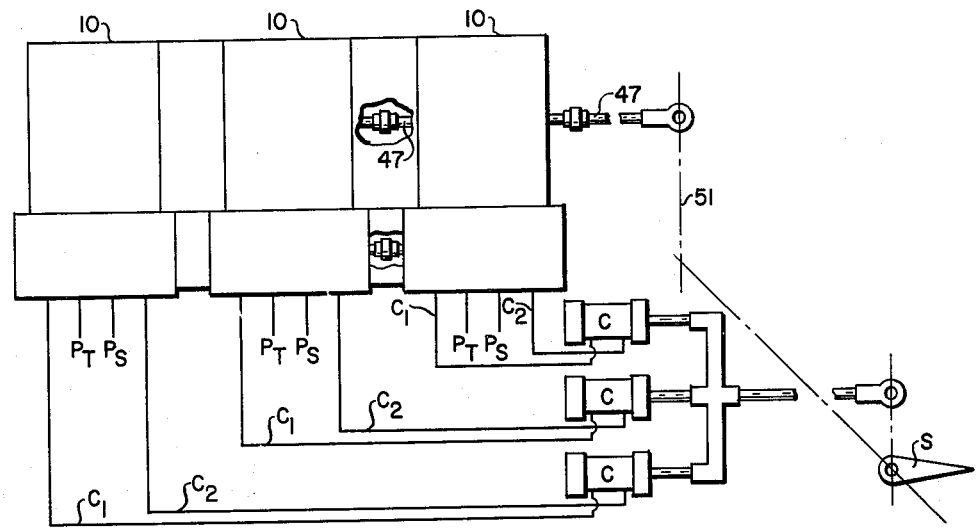
FIG. 11 is a diagrammatic view showing the manner in which the fluid power amplifiers are conected in a servo system.

The three A.C. torque motors 10 in the triple redundant system illustrated in FIG. 11 are interconnected by a common feed back rod 47. The feed back rods 47 are connected through solid linkages 51 directly to the control surface S and will position the three jet pipes relative to the second stage spools. Anti-backlash springs 54, bearing on the feed back yokes 48 eliminate lost motion in the feed back linkages (FIG. 1).

The servo valve system thus employs pure position feed back and is not affected by friction, mechanical hysteresis, or limited by spring or torque motor force levels. The torque motors can be independently adjusted for null and gain. The second stage spools can also be independently adjusted to synchronize operation of the triple redundant actuators.

The second stage spools are designed for rod end, as opposed to head end, control. Rod end control allows the spools to be pulled rather than pushed by a difference in the control pressures, eliminating column bending of the spool. With three spools mechanically linked, the column action resulting from a compressive loading and an unfavorable aspect ratio can cause an extremely high level of friction and hysteresis. Further, the more desirable tensile loading allows higher actuating forces to be employed to provide higher chip shearing force. Thus, contamination tolerance and reliability are further improved.

The positional feed back signal is distributed to each of the three integrated servo valves by the common mechanical feed back rod 47 (FIG. 1). This rod is provided with null adjustment so that each of the three first stages can be nulled progressively. The crank arm 50 (FIGS. 1 and 2) is also adjustable so that the gain of each stage can be brought into balance with its two sister stages.

The servo valve system offers a new approach to mechanical feed back type servo systems. Normally, a force feed back type linkage is employed to generate an error signal for corrective action by the servo valve. The servo system described herein does not employ a force feed back system to convert the controls surface position into a proportional force. Instead, a direct solid mechanical linkage connects the control surface to the position summing junction. The position of the load at the summing junction is therefore proportional to an angle to fixed ratio. The ratio is determined solely by the gear ratio or mechanical advantage of the interconnecting linkages.

To further understand the operation of the redundant system, consider the system, fully pressurized, and with no electrical inputs to the torque motors. Under these conditions the control surfaces will be in the neutral position and at rest.

Assume further that an external force causes the control surfaces to deflect 1° from the neutral position. When this occurs, the mechanical feed back linkage 47 will transmit a proportional angular motion to the summing junctions 39, corresponding to the 1° of control surface motion. An error signal will now exist at the output of the position summing junctions, namely, the tips of the jet pipe 12. The magnitude of the error in this case will be large enough to deflect the jet pipe 12 enough to cause the second stage spool 16 to move to its full rated stroke. The valves are interconnected with the actuators in a sense so that the full rated flow from the valves will now be ported to the end of the actuators C which will cause a restoring force to be applied against the external unbalancing force originally applied to the control surfaces.

Where a constant electrical signal is applied to the torque motor with the control surfaces resting in its neutral position, a constant torque output will be provided from the torque motors into the summing junction 39. The summing junction 39 will begin to rotate against the spring rate of the torsion barrier 44. Rotation of the summing junction 39 will stop when the restraining spring torque of torsion barrier 44 equals the electrical torque developed by the torque motors.

If constant current applied to the torque motors is enough to cause the jet pipes 12 to move the equivalent of 1° control surface error, the spools 16 will be stroked fully, and will port fluid to the actuators C; which, in turn, will cause the control surfaces to begin rotating. Rotation of the control surfaces will continue until the mechanical input to the summing junctions 39 has rotated the summing junctions 39, and the jet pipes 12, far enough to just cancel the rotation initially programmed into the summing junctions 39 by the torque motors.

I claim:
1. In a fluid power amplifier, the combination comprising
   a housing having a bore therein,
   a shiftable member disposed in said bore and having a pair of longitudinally spaced control chambers,
   a radially extending barrier on said member disposed between said control chambers,
   a diffuser opening to said bore,
   said opening being of limited circumferential width and having the longitudinal length of each control chamber being at least one half the longitudinal length of said diffuser opening, a longitudinal length greater than the longitudinal width of the barrier,
   longitudinally movable jet forming means for directing a high velocity jet into said diffuser opening,
   means forming a pair of opposed pressure effective areas on said member,
   and passage means for transmitting pressure from said control chambers to said pressure effective areas.

2. The combination set forth in claim 1 wherein said control chambers extend circumferentially with respect to said shiftable member.

3. The combination set forth in claim 1 wherein said barrier defines a narrow cylindrical surface with sharp edges.

4. The combination set forth in claim 1 wherein said barrier is formed by smoothly converging sides of the control chambers.

5. The combination set forth in claim 1 including an electrical torque motor operatively connected to said jet forming means for moving said jet forming means in response to an electrical signal.

6. In a fluid power amplifier, the combination comprising
   a housing having a bore therein,
   a shiftable member disposed in said bore and having a pair of longitudinally spaced control chambers,
   a radially extending barrier on said member disposed between said control chambers,
   said housing having a diffuser opening to said bore,
   said opening being of limited circumferential width and having a longitudinal length greater than the longitudinal width of the barrier,
   the longitudinal length of each control chamber being at least one half the longitudinal length of said diffuser opening,
   a jet pipe mounted in said housing for swinging movement such that a high velocity jet is directed transversely of said output member into said diffuser opening, means forming a pair of opposed pressure effective areas on said shiftable output member, passage means for transmitting pressure from said control chambers to said areas, an electrical torque motor in said housing, means interconnecting said torque motor and said jet pipe in such a manner that an electrical signal to said torque motor causes said jet pipe to move.

7. In a fluid amplifier, the combination comprising a housing having a bore therein, a shiftable member disposed in said bore and having a pair of longitudinally spaced control chambers, a radially extending barrier on said member disposed between said control chambers, said housing having a diffuser opening to said bore, said opening being of limited circumferential width and having a longitudinal length greater than the longitudinal width of the barrier, a jet pipe in said housing for swinging movement such that a high velocity jet is directed transversely of said output member into said diffuser opening, means forming a pair of opposed pressure effective areas on said shiftable output member, passage means for transmitting pressure from said control chambers to said areas, an electrical torque motor in said housing, means interconnecting said torque motor and said jet pipe in such a manner that an electrical signal to said torque motor causes said jet pipe to move, said means for mounting said jet pipe in said housing comprising a positioning platform rotatably mounted in said housing, a fluid supply tube having one end thereof rotatably mounted on said platform, said torque motor being operable to rotate said platform, means for supplying fluid to the other end of said tube, said torque motor having an armature surrounding said tube, a torsion tube surrounding said supply tube and having one end fixed to said armature and the other end fixed to said platform so that when the torque motor is energized the armature is rotated to rotate said platform, and a mechanical follow-up linkage connected to said platform so that when a mechanical follow up is applied to said platform said jet pipe is returned to its original position.

8. The combination set forth in claim 7 wherein said means for supplying fluid to said tube comprises
   a header in said armature,
   a plurality of circumferentially spaced tubes extending from said platform substantially parallel to said tube to said header,
   said smaller tubes being connected to a passage in said platform,
   means for supplying fluid through said housing to said passage,
   said header with said armature defining a chamber,
   said fluid passing through said smaller tubes through said header to said chamber and thereafter through said supply tube back to said platform.

9. The combination set forth in claim 7 wherein said mechanical linkage means is adjustable to control the degree of rotation of said platform relative to the mechanical signal thereto.

10. The combination set forth in claim 7 including a power unit operated by movement of said shiftable member, said mechanical linkage interconnecting said power unit and said platform directly.

11. The combination set forth in claim 7 wherein a plurality of housings are provided with the shiftable members of said housing directly interconnected and the mechanical feed back linkages to said platforms directly interconnected.

12. In a fluid power amplifier, the combination comprising
   a housing having a bore therein,
   a shiftable member disposed in said bore and having a pair of longitudinally spaced control chambers,
   a radially extending barrier on said member disposed between said control chambers,
   said housing having a diffuser opening to said bore,
   said opening being of limited circumferential width and having a longitudinal length greater than the longitudinal width of the barrier,
   means forming a pair of opposed pressure effective areas on said member,
   passage means for transmitting pressure from said control chambers to said pressure effective areas,
   a jet tube for directing the high velocity jet into said diffuser opening,
   a relatively rigid supply pipe on which said jet tube is mounted,
   a summing junction in said housing,
   said pipe having one end fixed to said summing junction,
   means for supplying fluid to said one end of said supply pipe,
   a torque tube surrounding said supply pipe and having one end thereof fixed to said summing junction,
   a positioning platform rotatably mounted in said housing,
   the other end of said torque tube being fixed to said positioning platform,
   and a mechanical follow-up linkage connected to said platform.

13. The combination set forth in claim 12 wherein said means for supplying fluid to one end of said supply pipe comprises a plurality of tubes circumferentially spaced around said torque tubes and having one end thereof fixed to said positioning platform and the other end thereof fixed to said summing junction.

14. In a fluid power amplifier, the combination comprising
   a housing having a bore therein,
   a shiftable member disposed in said bore and having a pair of longitudinally spaced control chambers,
   a radially extending barrier on said member disposed between said control chambers,
   said housing having a diffuser opening to said bore,
   said opening being of limited circumferential width and having a longitudinal length greater than the longitudinal width of the barrier,
   means forming a pair of opposed pressure effective areas on said member,
   passage means for transmitting pressure from said control chambers to said pressure effective areas,
   a jet tube for directing the high velocity jet into said diffuser opening,
   a relatively rigid supply pipe on which said jet tube is mounted,
   a summing junction in said housing,
   said pipe having one end fixed to said summing junction,
   means for supplying fluid to said one end of said supply pipe,
   a torque tube surrounding said supply pipe and having one end thereof fixed to said summing junction,
   a positioning platform rotatably mounted in said housing,
   the other end of said torque tube being fixed to said positioning platform,
   a torque motor having an armature surrounding said torque tube and fixed to said summing junction,
   and a mechanical follow-up linkage connected to said platform.

15. The combination set forth in claim 14 wherein said means for supplying fluid to one end of said supply pipe comprises
   a plurality of tubes circumferentially spaced around said torque tube and having one end thereof to said positioning platform and the other end thereof fixed to said summing junction,
   said armature cooperating with said summing junction to form a header communicating with the interior of said circumferentially spaced tubes, said positioning platform being formed with passage means communicating with the other ends of said circumferentially spaced tubes.

16. The combination set forth in claim 14 wherein said diffuser opening and said jet tube are so located with respect to said shiftable member that the jet impinges upon the shiftable member other than radially, thereby inducing rotation of the shiftable member in said bore.

17. In a fluid power amplifier, the combination comprising
a housing having a bore therein,
a shiftable member disposed in said bore and having a pair of longitudinally spaced control chambers,
a radially extending barrier on said member disposed between said control chambers,
a diffuser opening to said bore,
said opening being of limited circumferential width and having a longitudinal length greater than the longitudinal width of the barrier,
the longitudinal length of each control chamber being at least one half the longitudinal length of said diffuser opening,
a longitudinally movable jet forming means for directing a high velocity jet into said diffuser opening,
means forming a pair of opposed pressure effective areas on said member,
passage means for transmitting pressure from said control chambers to said pressure effective areas,
and means defining an exhaust outlet for said control chambers thereby providing greater stability.

18. In a fluid power amplifier, the combination comprising a housing having a bore therein, a shiftable member disposed in said bore and having a pair of longitudinally spaced control chambers, a radially extending barrier on said member disposed between said control chambers, a diffuser opening to said bore, said opening being of limited circumferential width and having a longitudinal length greater the the longitudinal width of the barrier, longitudinally movable jet forming means for directing a high velocity jet into said diffuser opening, means forming a pair of opposed pressure effective areas on said member, and passage means for transmitting pressure from said control chambers to said pressure effective areas, said diffuser opening and said jet forming means being so located with respect to said shiftable member that the jet impinges on the shiftable member other than radially, thereby inducing rotation of the shiftable member in said bore.

19. In a fluid power amplifier, the combination comprising a housing having a bore therein, a shiftable member disposed in said bore and having a pair of longitudinally spaced control chambers, a radially extending barrier on said member disposed between said control chambers, a diffuser opening to said bore, said opening being of limited circumferential width and having longitudinal length greater than the longitudinal width of the barrier, longitudinally movable jet forming means for directing a high velocity jet into said diffuser opening, means forming a pair of opposed pressure effective areas on said member, and passage means for transmitting pressure from said control chambers to said pressure effective areas, said opposed pressure effective areas being so located with respect to said shiftable member as to place said shiftable member under tension when the pressure in one of said areas or the other of said areas is such to cause the shiftable member to move.

20. In a fluid power amplifier, the combination comprising a housing having a bore therein, a shiftable member disposed in said bore and having a pair of longitudinally spaced control chambers, a radially extending barrier on said member disposed between said control chambers, a diffuser opening to said bore, said opening being of limited circumferential width and having a longitudinal length greater than the longitudinal width of the barrier, longitudinally movable jet forming means for directing a high velocity jet into said diffuser opening, means forming a pair of opposed pressure effective areas on said member, passage means for transmitting pressure from said control chambers to said pressure effective areas, and means defining an exhaust outlet for said control chambers thereby providing greater stability, said diffuser opening and said jet forming means being so located with respect to said shiftable member that the jet impinges on the shiftable member other than radially, thereby inducing rotation of the shiftable member in said bore.

21. In a fluid power amplifier, the combination comprising a housing having a bore therein, a shiftable generally cylindrical member disposed in said bore and having a pair of longitudinally spaced annular control chambers, a radially extending barrier on said member disposed between said control chambers, a diffuser opening to said bore, said opening of limited circumferential width and having a longitudinal length greater than the longitudinal width of the barrier, the longitudinal length of each control chamber being at least one half the longitudinal length of said diffuser opening, longitudinally movable jet forming means for directing a high velocity jet into said diffuser opening, means forming a pair of opposed pressure effective areas on said member, and passage means for transmitting pressure from said control chambers to said pressure effective areas.

22. The combination set forth in claim 21 wherein said diffuser and said jet forming means are so located with respect to said shiftable member that the jet impinges on the shiftable member other than radially, thereby inducing rotation of said shiftable member in said bore.

References Cited by the Examiner

UNITED STATES PATENTS

| | | |
|---|---|---|
| 2,047,922 | 7/36 | Seligmann. |
| 2,655,902 | 10/53 | Ziebolz. |
| 2,672,150 | 3/54 | Benedict et al. _____ 137—83 |
| 2,884,906 | 5/59 | Atchley. |
| 2,884,907 | 5/59 | Atchley. |
| 2,933,106 | 4/60 | Gerwig et al. _____ 137—623 |
| 3,011,505 | 12/61 | Reip _____ 137—83 |

FOREIGN PATENTS

| | | |
|---|---|---|
| 621,749 | 11/35 | Germany. |
| 410,244 | 3/45 | Italy. |

FRED E. ENGELTHALER, *Primary Examiner.*